Jan. 9, 1945.  A. J. ENGLAND  2,366,960
MANUFACTURE OF ORNAMENTAL CHAIN
Filed Sept. 26, 1941  8 Sheets-Sheet 2
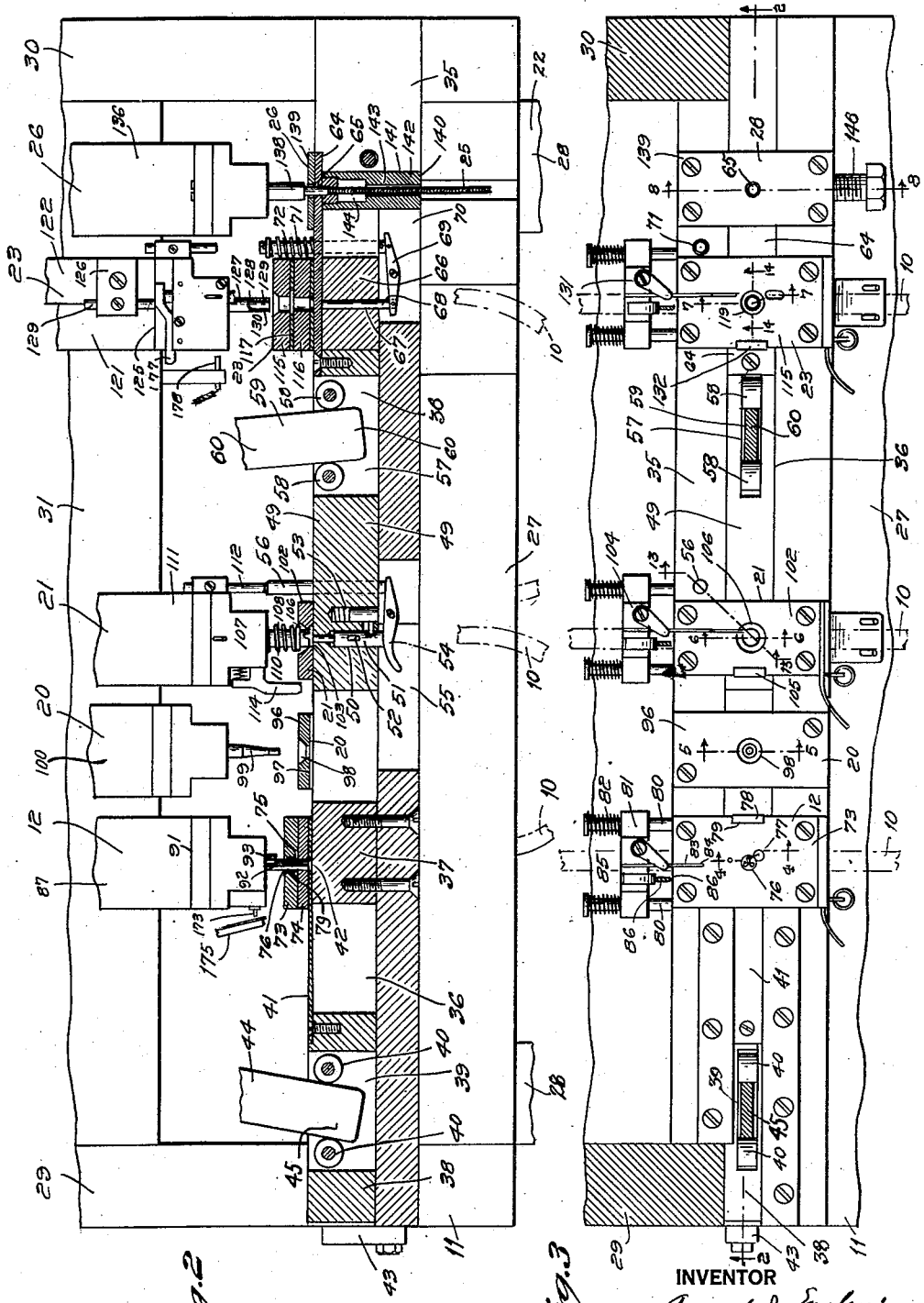
INVENTOR
August J. England
BY
Nathaniel Frucht
ATTORNEY Jan. 9, 1945.   A. J. ENGLAND   2,366,960
MANUFACTURE OF ORNAMENTAL CHAIN
Filed Sept. 26, 1941   8 Sheets-Sheet 3

INVENTOR
August J. England
BY Nathaniel Frucht
ATTORNEY

Jan. 9, 1945.  A. J. ENGLAND  2,366,960
MANUFACTURE OF ORNAMENTAL CHAIN
Filed Sept. 26, 1941  8 Sheets-Sheet 4
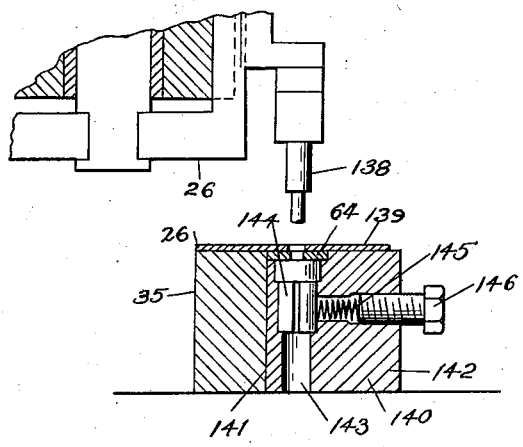
Fig. 8
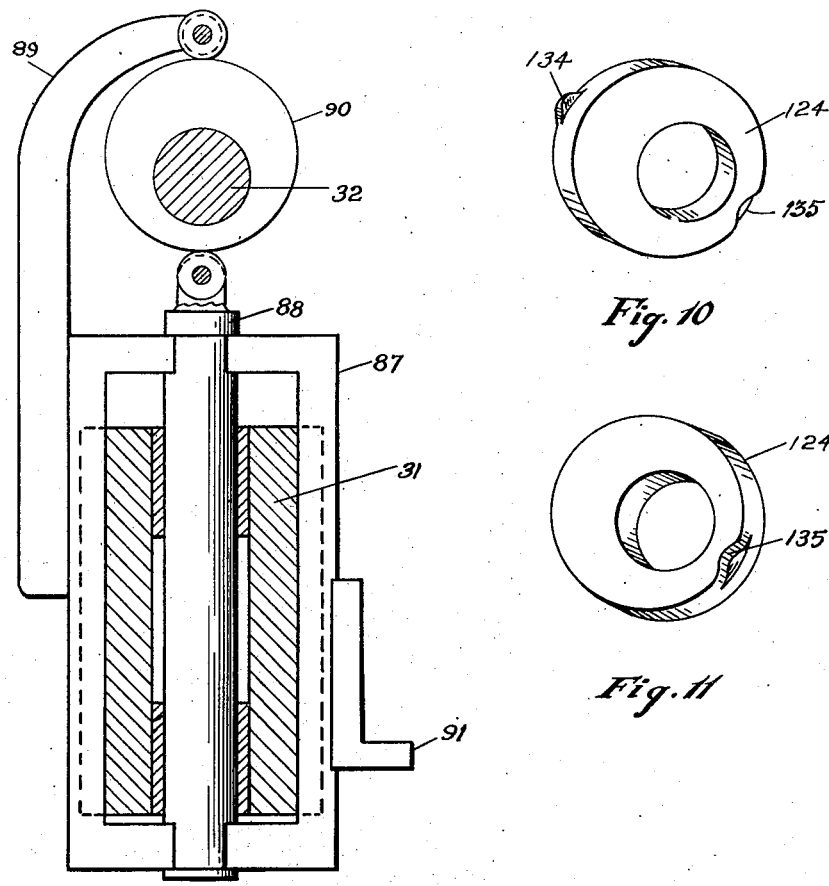
Fig. 9
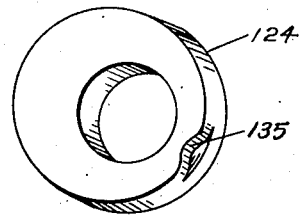
Fig. 10
Fig. 11
INVENTOR
August J. England
BY
Nathaniel Frucht
ATTORNEY

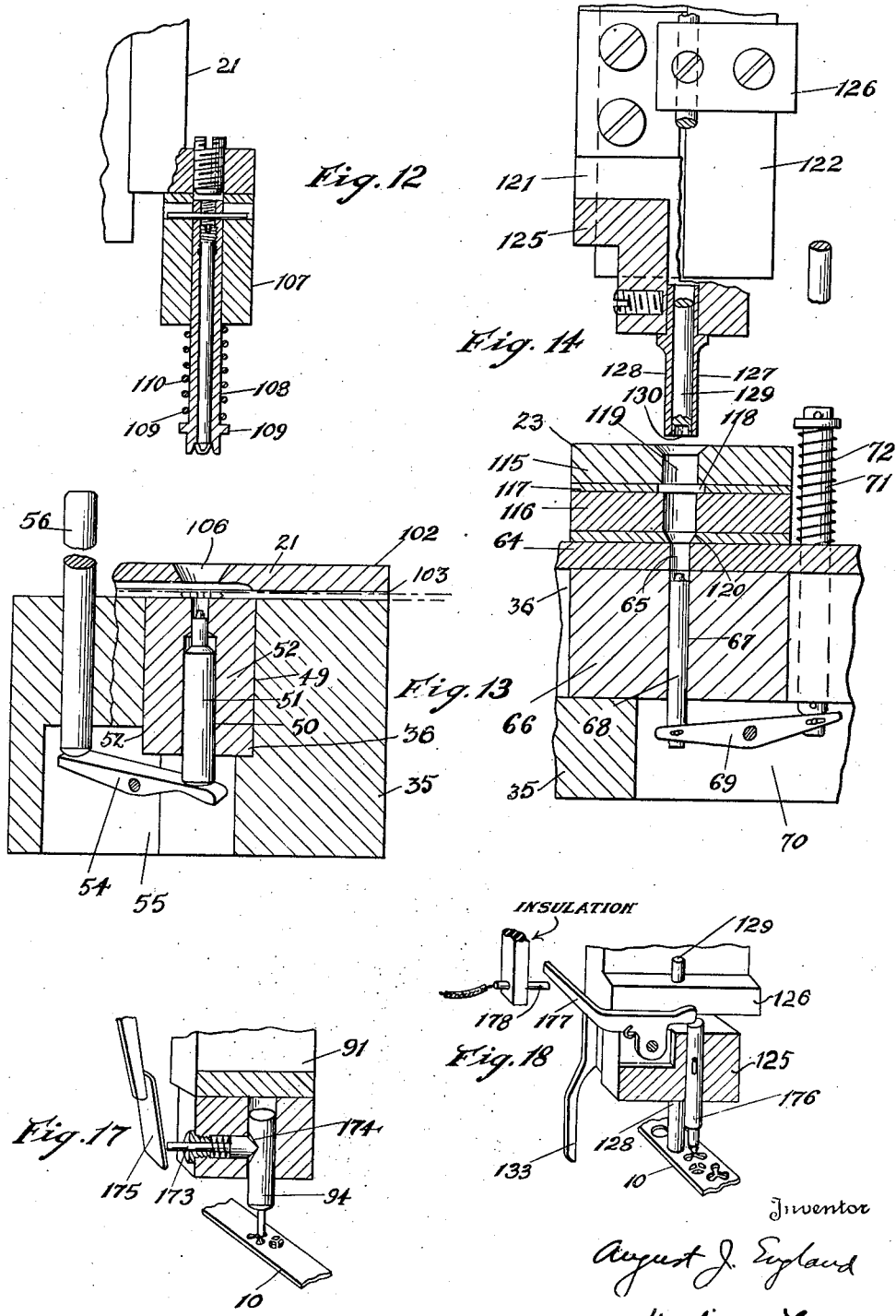

Jan. 9, 1945.  A. J. ENGLAND  2,366,960
MANUFACTURE OF ORNAMENTAL CHAIN
Filed Sept. 26, 1941  8 Sheets-Sheet 6
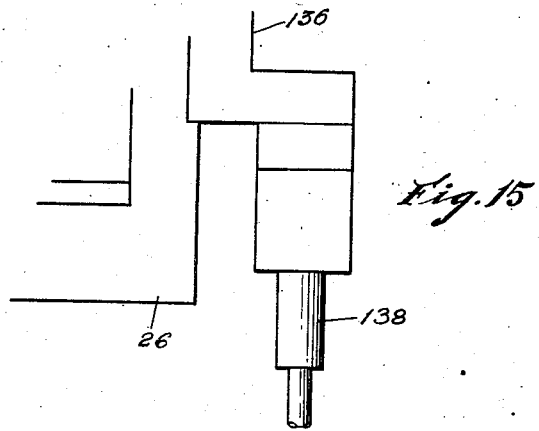
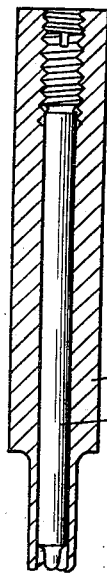
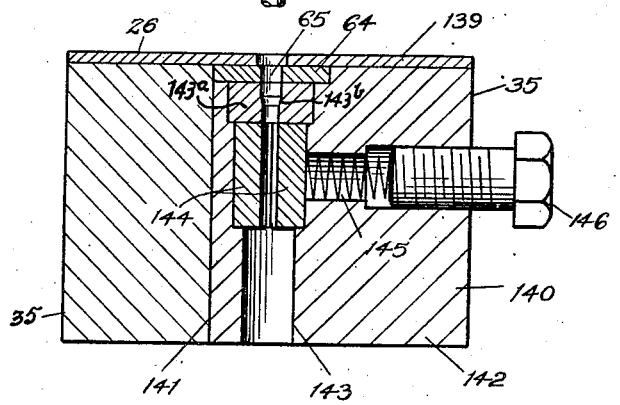
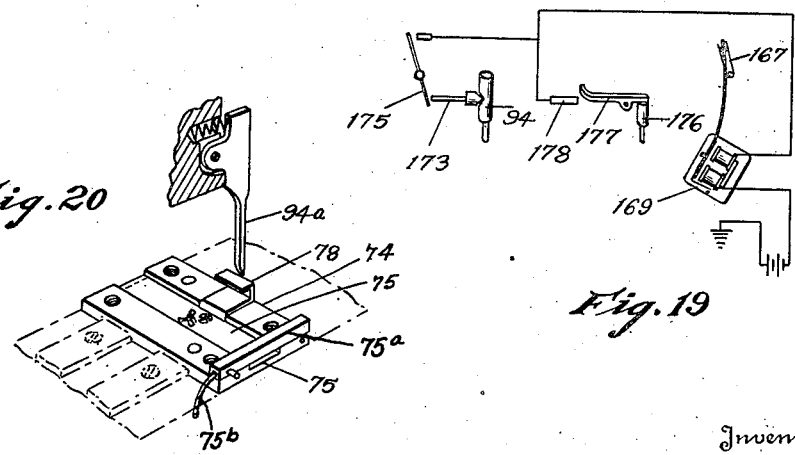
Inventor
August J. England
By Nathaniel Frucht
Attorney Jan. 9, 1945.   A. J. ENGLAND   2,366,960
MANUFACTURE OF ORNAMENTAL CHAIN
Filed Sept. 26, 1941   8 Sheets-Sheet 8

Inventor
August J. England
Nathaniel Frucht
By   Attorney

Patented Jan. 9, 1945

2,366,960

UNITED STATES PATENT OFFICE 2,366,960

MANUFACTURE OF ORNAMENTAL CHAIN

August J. England, Providence, R. I., assignor to England Manufacturing Co., a corporation of Rhode Island Application September 26, 1941, Serial No. 412,448

11 Claims. (Cl. 59—14)

REISSUED

JUL 2 2 1947

My present invention relates to the jewelry art and more particularly to a novel construction of snake chain and a novel method and apparatus for making the same.

The principal object of the present invention is to provide a novel apparatus and a novel method of assembly for producing a snake chain having a high degree of flexibility and great strength.

Another object of the present invention is to provide an apparatus for automatically and continuously making snake chain from sheet stock.

A further object of the present invention is to provide an apparatus for making snake chain which has a high degree of accuracy and which will withstand factory production without breakdown.

Another object of the present invention is to provide a continuous method of manufacturing snake chain in commercial quantities and with a minimum of waste of stock and a minimum of wear on tools.

With the above and other objects and advantageous features in view, my invention consists of a novel snake chain and a novel method and apparatus for manufacturing the same, more fully disclosed in the detailed description following, in conjunction with the accompanying drawings, and more fully defined in the appended claims.

In the drawings:

Fig. 2 is an enlarged longitudinal section of the die bed on line 2—2 of Fig. 3;

Fig. 3 is a top plan view of the die bed;

Fig. 8 is a similar view of the assembly draw die on line 8—8 of Fig. 3;

Fig. 9 is a section taken along line 9—9 on Fig. 1;

Figs. 10 and 11 are perspective views of the cam for operating the lower plunger of the cutting and drawing die;

Fig. 12 is a sectional view of the inserting die punch on line 12—12 of Fig. 1;

Fig. 13 is a sectional view of the corresponding die for the inserting die punch on line 13—13 of Fig. 3;

Fig. 14 is a view, partly in section, of the cutting and drawing die in a plane at right angles to Fig. 7 on line 14—14 of Fig. 3;

Fig. 15 is a view similar to Fig. 8 on an enlarged scale completely in section;

Fig. 16 is an enlarged section of the punch for the assembly draw die on line 16—16 of Fig. 1;

Fig. 17 is a perspective view of the safety stop actuator on the blanking die partly in section as on line 17—17 of Fig. 4;

Fig. 18 is a similar view of the actuator on the cutting and drawing die partly in section as on line 18—18 of Fig. 7;

Fig. 19 is the wiring diagram for the automatic safety stop;

Fig. 20 is a perspective view of one of the stock positioning devices the die plate having been removed;

The method

Figure 23:
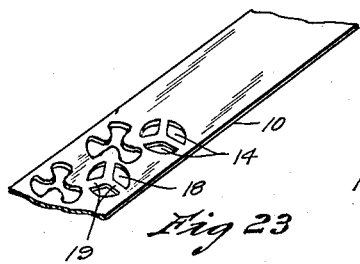
Fig. 23 is a perspective view of the stock after passing through the cutting and blanking die.

The manufacture of my novel snake chain is an automatic and continuous operation from a single source of supply of sheet stock; the chain being formed in the following manner:

Referring to Figs. 1 and 23 to 34 inclusive, a continuous length of thin sheet stock 10 is fed into the machine 11 at a uniform predetermined rate of speed. The stock 10 first passes through the blanking and piercing die 12, which blanks out the crowfoot links 13, see Fig. 24 and forms the piercings 14 in the blank, see Fig. 23. Each crowfoot link 13 comprises a plurality (three illustrated) of equidistant radially disposed arms having enlarged heads 15 and narrow neck portions 16 integrally joined at the center 17. The piercings 14 are spaced alternately with the blanking adjacent one edge of the stock as illustrated in Fig. 23. Each piercing comprises an annular opening 18 bridged by a plurality (three illustrated) of integral equidistant radially disposed arms 19, dividing the opening 18 into the same number of segments as there are arms on the crowfoot link 13. This completes the first step.

In the second step the crowfoot links 13 are carried by the machine to the dapping die 20. The die 20 bends the crowfoot links 13 into the form shown in Figs. 25 and 26, the heads 15 and necks 16 being bent upwardly and the center 17 remaining flat, to form a cup shape.

The third step carries the dapped crowfoot link into the inserting die 21. The stock 10, having emerged from the blanking and piercing die 12, is given a half-turn manually to position the burrs on the inside before it is fed into the inserting die 21. The die 21 inserts the arms of the crowfoot link 13 into the piercings 14, see Figs. 27 and 28, the heads 15 passing through the widest portions of the piercings. The link arms are pulled slightly inwardly, the necks 16 entering the narrower portion of the piercings 14, so that the enlarged heads 15 prevent the links 13 from falling out. Simultaneously with the inserting operation, the arms 19 across the piercings are pushed inwardly as at 22 in Fig. 28, to provide the stock 10 with a substantially flat bottom and insure a smooth feed for the subsequent operations. This inward push also starts the bars 19 bending in the proper direction for the drawing operation.

Figure 31:
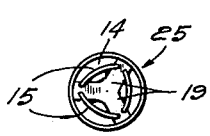
Fig. 31 is a view of the links after the drawing operating in the cutting and drawing die.
Figure 32:
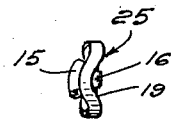
Fig. 32 is a side view of the same.

For the fourth step, the stock 10, now carrying the crowfoot links 13 in the piercings 14, passes into a cutting and drawing die 23. This die first cuts out an annular disc 24, see Figs. 29 and 30, which includes the piercings 14 and link 13, and then draws the disc 24 into the form of a chain segment 25 as shown in Figs. 31 and 32. During the drawing operation, the flat outer periphery of the disc 24 is turned upwardly at right angles and since the pressure is applied only at the extreme ends of the cross bars 19, the stock drags through the die and forms a wavy exterior, see Fig. 32, the low points being adjacent the bars 19 where the pressure is applied and the high points being adjacent the piercings where the disc metal is unsupported. During this step, the bars 19 are again pushed inwardly, carrying the crowfoot link 13 upwardly with it so that the head portions 15 extend above the edge of the segment 25, see Fig. 32.

Figure 33:
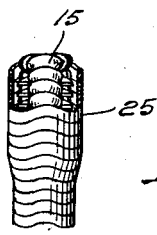
Fig. 33 is a view of the assembled links.
Figure 34:
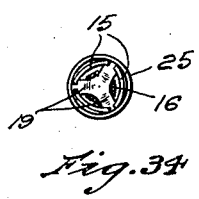
Fig. 34 is a plan view of the completed chain after passing through the assembly draw die.

In the fifth and final step, the segments 25 are passed through the assembly draw die 26 which joins the segments together and locks them into the finished snake chain. As shown in Figs. 33 and 34, the segments 25 are pushed one over the other so that the enlarged heads 15 of each crowfoot link 13 passes upwardly through the piercings 14 of the vertically adjacent segment and around the outer surface of the crowfoot link carried by the adjacent segment. The wavy edges of the segments causes them to align and nest in each other as shown in Fig. 33 forming an unbroken annular outer surface and alternate layers of crowfoot links 13 and cross bars 19 inside. Each crowfoot link 13 therefore extends through its own segment piercing, past the bars 19 in its own segment, and into the piercings of the vertically adjacent segment.

In this position, the nested segments are forced through the draw die 26 with the result illustrated in Figs. 33 and 34. The outer periphery of each segment is lessened, the surplus stock crowding upwardly to increase the wavy curvature of the segment. This also reduces the diameter of the segment, and the cross arms 19 are pushed further inwardly and upwardly, moving the crowfoot links 13 further into the vertically adjacent segment. Simultaneously, the enlarged heads 15 of the crowfoot links 13 are crowded towards the center, see Fig. 34, due to the reduction of the diameter of the segment. Since the piercings 14 are of narrower width adjacent the center, the enlarged heads 15 of each link 13 will overlap the cross-bars 19 of the vertically adjacent segment and cannot withdraw therefrom. The reduced diameter therefore locks the crowfoot heads in position, which in turn lock the segments to each other, thus completing the chain.

The resultant chain will possess a great deal of flexibility and the links will not part. The locking action is positive and permanent, and only a force sufficient to break the cross bars or crowfoot links will cause the chain to part. Furthermore, the hereinabove described method permits the assembly of the chain with a maximum of ease, a minimum waste of stock, and a high degree of accuracy. The parts are not rammed or forced together or otherwise distorted until the chain is finally locked together. The stamping of the blank and piercing from the same stock, and the insertion of the blank into the sheet stock before the cutting operation, permits more rapid and accurate assembly without complicated machinery and promotes ease of operation and adjustment. Other advantages of the above method will be readily apparent to a person skilled in the art.

The apparatus

A preferred machine for carrying out the novel method is illustrated in Figs. 1 to 22 inclusive. The machine 11 is mounted on a base 27 supported on suitable legs or standards 28. Mounted on the base 27 is an H-frame which comprises vertical arms 29 and 30 extending upwardly from opposite ends of the base, the arms 29 and 30 being joined by a horizontal support plate 31, see Fig. 1, which carries the various plungers for the die punches. An operating shaft 32 is journalled in the upper ends of the arms 29 and 30; the shaft 32 being driven by a conventional pulley and belt arrangement 33 from one end, and being provided with a hand wheel 34 at its opposite end. The shaft 32 carries the various cams for operating the dies hereinafter to be described.

The die bed

Figure 1:
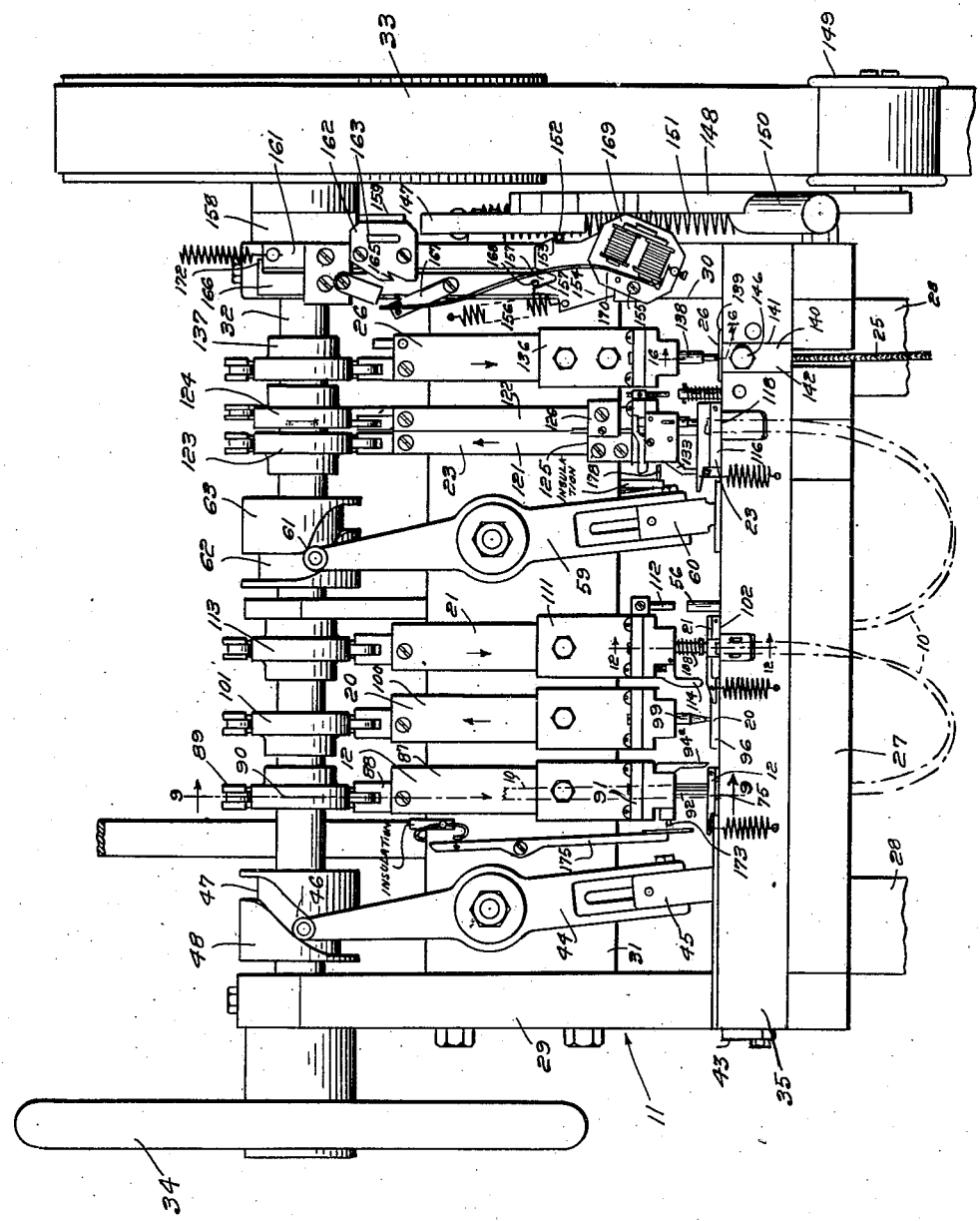
Fig. 1 is a front elevation of a snake chain machine embodying my invention.

A rectangular block 35 is mounted on the base 27 parallel to and just forward of the supporting plate 31; the block 35 constituting a die bed for the various dies and punches of the machine. The block 35 is provided with a central longitudinal groove 36 extending throughout the length thereof and forming a rectangular channel. Referring to Figs. 1, 2 and 3, a rectangular block 37 is bolted in the channel 36 beneath the blanking and piercing die 12, the block 37 being flush with the top of the block 35. A block 38 is slidably mounted in the channel 36 to the left of the block 37 (Fig. 2) and is provided with a slot 39 in which spaced rollers 40 are mounted. A carrier plate 41 is bolted to the top of the block 38, adjacent one edge thereof, and extends over the top of the block 37. The plate 41 is slidable beneath the dies 12 and 20 and is provided with an opening 42 adapted to receive the crowfoot link blank 13 and align with die openings. A stop element 43 is bolted to the block 35 at the end of the channel 36 to limit the sliding movement of the block 38.

The block 38 is reciprocated in the channel 36 by a rocker arm 44 pivotally mounted on the plate 31. The lower end of the rocker arm 44 is adjustable, as at 45, and extends between the rollers 40 in the block 38. The upper end of the rocker arm 44 is provided with a roller 46 extending into a groove 47 in a cylindrical cam 48 mounted on the shaft 32.

Slidably mounted in the channel 36 is a second block 49 to the right of the block 37, Fig. 2. The block 49 is provided with a vertical opening 50 which aligns with the die 20 when the block 49 is at its extreme left, and which aligns with the die 21 when the block 49 is at its extreme right. A plunger 51 is slidably mounted in the opening 50, as by the pin and slot arrangement 52, and may be resiliently retained in its lower position by a pin and spring arrangement 53.

Reciprocation of the plunger 51 is provided by an arm 54 pivotally mounted in a slot 55 in the block 35, the lower end of the plunger 51 riding over one end of the arm when the slide block 49 is at its extreme right. An operating plunger 56 extends vertically through the block 35, its lower end resting on the other end of the arm 54.

Sliding movement of the block 49 is provided by a cam and rocker arm arrangement similar to that of the block 38. The block 49 is provided with a slot 57 in which rollers 58 are mounted. A rocker arm 59 is pivotally mounted on the support plate 31 with its lower adjustable end 60 extending between the rollers 58 and its upper end being provided with a roller 61 extending into the groove 62 of the cam 63.

A carrier plate 64 is fixed to the upper right edge of the block 49 and extends laterally therefrom. The plate 64 is provided with an opening 65 adapted to align with the die 23 when the block 49 is at its extreme left, and to align with the die 26 when the block 49 is at its extreme right. Movement of the block 49 to the right is limited by a block 66 fixed on the channel 36 beneath the die 23, the plate 64 being slidable thereover.

The block 66 is provided with a central vertical opening 67 in which a plunger 68 is slidable. The lower end of the plunger 68 is pivotally fixed to one end of a lever arm 69 which is pivoted in a slot 70 in the base 35. The other end of the arm 69 is pivotally fixed to a vertical rod 71 extending through the base 35 and being surrounded by a spring 72 urging the rod upwardly.

The various dies cooperating with the die bed hereinabove described may now be described as follows:

The blanking and piercing die

The blanking and piercing die 12 comprises upper and lower die plates 73 and 74 which straddle the channel 36 of the die bed as shown in Fig. 3. The lower die element 74 is provided with a slot 75 through which the sheet stock is fed through the die, the initial positioning of the sheet stock in the slot being facilitated by lifting a hinged stock retainer bar 75a provided with a handle 75b. The upper die element 73 is provided with offset openings 76 and 77, the opening 76 being shaped to provide a blank for the crowfoot link 13 and the opening 77 being adapted to form the piercings 14. To insure accuracy of the various die operations regardless of any variations in the width of the stock, the lower die element is provided with a loose plate 78 shown in Fig. 20 along the right edge thereof which is slidable into the slot 75 and which is exposed through a cut-out 79 in the upper die element 73. Thus pressure on the plate 78 along the right edge will push the stock towards the left edge of the slot 75 which acts as a guide. A spring pressed guide finger 94a, see Fig. 20, is provided to push the loose plate 78 against the stock in the slot 75, to thus compensate for variations in the width of the stock and to ensure pressing the stock against the left edge of the slot.

Figure 4:
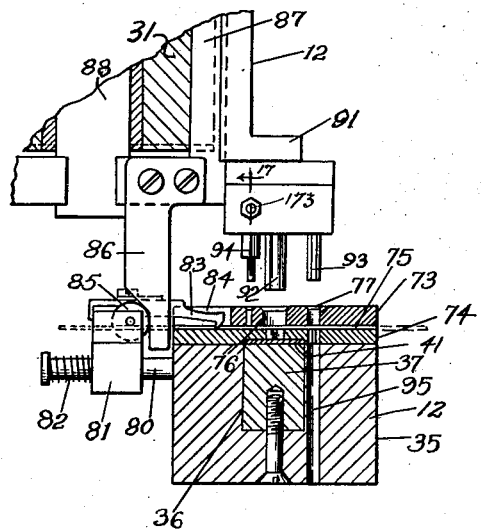
Fig. 4 is a vertical section of the blanking and piercing die on line 4—4 of Fig. 3.

The stock is fed through the die element 73 and 74 by the arrangement shown in Figs. 3 and 4. Spaced rods 80 are mounted in the block 35 and extend rearwardly below the level of the die plates. A slide block 81 is slidable on the rods 80 and is urged towards the block 35 by coil springs 82. A finger 83 is pivotally mounted on the block 81 and is slidable in a slot 84 in the upper die block so that in its forward position the hooked end of the finger extends into the piercing in the stock left by the crowfoot link 13.

The block 81 is also provided with a roller 85 disposed beneath a cam 86 in the punch. Vertical movement of the cam 86 causes the block 81 to slide rearwardly against the action of the spring 82 and causes the finger 83 to move the stock rearwardly through the die.

The die punch comprises a housing 87 slidably mounted around the support plate 31, see Fig. 1. A plunger 88 is vertically reciprocable with the housing 87 and is provided with a C-shaped arrangement 89, see Fig. 9. Its upper end has upper and lower rollers bearing against the cam 90 which is keyed to the shaft 32. Turning movement of the cam 90 thus raises and lowers the plunger 88. The lower front face of the housing 87 is provided with an integral forwardly extending foot 91 to which the die punch is bolted. The blanking and piercing die is provided with a punch 92 which is shaped to blank the crowfoot link 13 and enters the die opening 76, a punch 93 which is shaped to provide the piercings 14 and which enters the opening 77, and a false punch 94 whose purpose will hereinafter be described. The die elements 73 and 74 and the die block 37 are provided with a vertical opening 95 through which the scrap stock from the piercings 14 drop through the machine.

The dapping die

Figure 5:
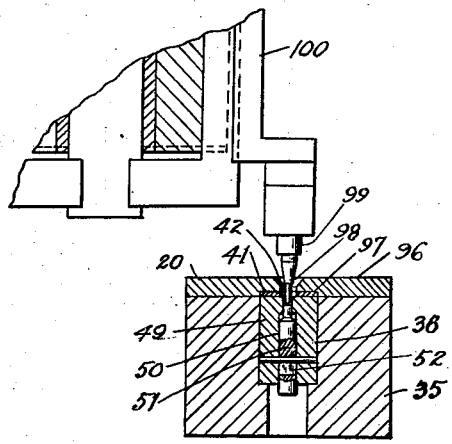
Fig. 5 is a similar view of the dapping die on line 5—5 of Fig. 3.
Figure 6:
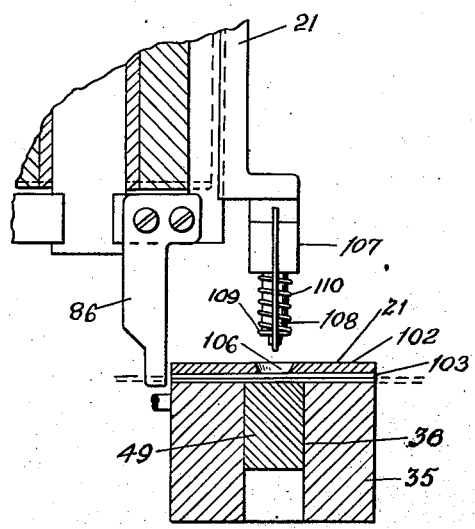
Fig. 6 is a similar view of the inserting die on line 6—6 of Fig. 3, the block 49 having moved over to the left.
Figure 7:
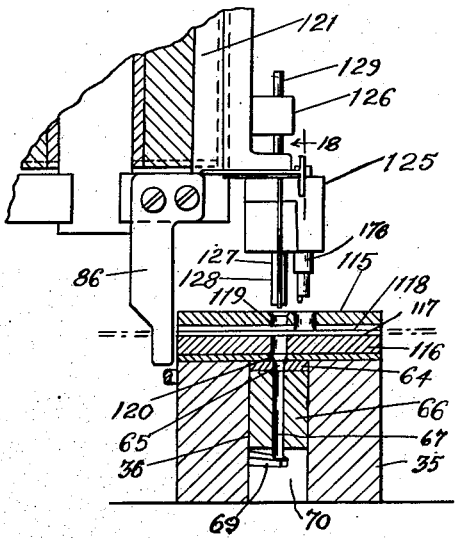
Fig. 7 is a similar view of the cutting and drawing die on line 7—7 of Fig. 3.

The dapping die 20 comprises a single die plate 96 which straddles the channel 36 spaced from and parallel to the die plates 73 and 74. The plate 96 is provided with a transverse channel 97 through which the plate 41 is slidable, and a die opening 98 which tapers downwardly as shown in Fig. 5. The die punch 99 is conical in shape and is provided with a flat end adapted to push into the center flat portion 17 of the crowfoot link 13. The punch 99 is operated by a plunger arrangement 100 similar to the arrangement for operating the die 12; reciprocation of the die being provided by the cam 101 on the shaft 32 in timed relation to the movement of the die 12.

The inserting die

The inserting die 21 comprises a die plate 102 which also straddles the channel 36 in spaced parallel relation to the dies 12 and 20. The die plate 102 is provided with a channel 103 through which the stock is pulled by the feed arrangement 104 at the rear of the die similar to the feed on the die 12. Inasmuch as the stock is turned before it enters the die 21, the guide is now provided on the right side of the slot 103. The die plate 102 must therefore be provided with a loose plate 105 to the left of the slot 103 and bearing against the left edge of the stock. The die plate 102 is provided with a tapered opening 106 over the slot 103. The punch 107 comprises an integral portion 108 which is provided with a hollow slightly inwardly tapered end adapted to fit over the upstanding arms of the crowfoot link 13, and a vertical adjustable rod adapted to contact the center 17 of the crowfoot link, see Fig. 12. The outer portion of the punch 108 is provided with an integral washer or annular ring 109 for supporting a coil spring 110 surrounding the punch. The plunger arrangement 111 for operating the punch is also provided with a vertical pin 112 adapted to bear against the upper end of the rod 56 as shown in Fig. 2. The arrangement 111 is similar to the hereinabove described arrangement for operating the dies 12 and 20 and is controlled by a cam 113 on the shaft 32, the cams 90 and 113 operating simultaneously so that the dies 12 and 21 operating in unison, and the cam 101 being oppositely disposed so that the die 20 operates alternately with the dies 12 and 21. The guide plate 105 is operated by a downwardly extending finger 114 on the plunger arrangement 111, and is adapted to move the plate inwardly at each downward movement of the plunger in a manner similar to the finger 94a on the plunger 88.

The punch 107 is so positioned that the stock will be contacted and held in position before the plunger reaches the bottom of its stroke. Additional motion is taken up by the spring 110 and permits the pin 112 to contact and move the plunger 56.

The cutting and drawing die

The cutting and drawing die 23 comprises spaced superimposed die plates 115 and 116 straddling the channel 36 above the block 66. The plates 115 and 116 are separated by a spaced element 117 forming a wide slot 118 extending between the plate through which the stock and the crowfoot links are fed. A vertical die opening 119 extends through the plates 115 and 116 in alignment with the opening 67 in the block 66. The cutting is done on the shoulders of the lower die element 116 and the drawing is done at the lower end of the opening 119, as at 120, where the passageway is restricted.

The die punch 23 is provided with two operating portions 121 and 122 each operable from a cam mounted on the shaft 32, the portion 121 operating from a cam 123 and the portion 122 operating from a cam 124. The operating plunger 121 is provided with a punch-holding assembly 125 which extends forwardly and laterally towards the plunger 122, and the plunger 122 is provided with a laterally extending member 126 having a vertical opening therethrough in alignment with the punch openings in the assembly 125. The die punch 127 comprises an outer cylindrical blanking plunger 128 fixed to the assembly 125. The draw punch 129 is slidable in the blanking punch 128 and extends upwardly into and is adjustably secured in the member 126, see Fig. 14. The lower end of the draw punch 129 is provided with a recess 130 to accommodate the upwardly extending arms of the crowfoot link 13.

The stock is fed through the die 23 by means of the assembly 131 identical with the feeding assembly on dies 12 and 21 as shown in Fig. 3. Furthermore, the die plates are provided with a centering guide 132 operable by an arm 133 on the die punch and adapted to guide the stock through the die against the right edge of the slot 118.

The cam 124 is similar to the cam 123 except that it is provided with an additional bump or high-point 134 adjacent one edge and an inset or lower point 135 diagonally opposite and adjacent the opposite edge. With this construction, the plungers 121 and 122 will raise and lower simultaneously thus causing the cutting and drawing plungers 128 and 129 to raise and lower simultaneously. However, once at every revolution the plunger 122, operating the draw punch 129 will be given an additional downward and upward motion synchronized to occur at the lower end of the stroke and just prior to the lifting of the plunger 121.

The drawing die

The drawing die 26 comprises a plunger 136 similar to the operating plunger of the dies 12, 20, and 21 and operating from a cam 137 on the operating shaft. The die punch 138 comprises a hollow cylindrical body having a wavy bottom edge conforming to the edge of the links, and an inner adjustable plunger 138a. The punch 138 passes through a die plate 139 on the block 35. The die assembly 140 is removably locked in a recess 141 extending into the front of the die bed or plate 35. It comprises a block 142 having a vertical opening 143 therethrough, which as shown in Fig. 15 is aligned with an element 143a having an opening 143b which is sufficiently wide at its upper end to accommodate the chain links and the die punch, and it tapers inwardly to provide the drawing action of the die. Below the tapered portion are a pair of split die friction elements 144 adjustably urged towards each other by the spring 145 and screw 146 to frictionally retard the movement of the chain through the die.

Safety stop mechanism

The hereinabove described assembly is also provided with a safety stop mechanism to insure complete accuracy and prevent jamming. Referring to Figs. 1, 19, 21 and 22, the stop mechanism is mounted on the frame 30 adjacent the belt and pulley drive 33. An arm 147 is transversely pivotally mounted on the side of the frame 30 at 147a and has a depending arm 148 which is adjustably fixed thereto. The arm 148 is provided with an idler pulley 149 at its lower end bearing against the drive belt. The arm 148 is also provided with an integral forwardly extending handle 150. A spring 151 is attached to the frame 30 and the inner end of the arm 147 and is adapted to resiliently urge the arm 147, arm 148, and roller 149 away from the drive belt which is normally loose so that the machine will not operate unless the roller 149 is pushed inwardly against the belt to take up the slack.

To hold the belt in operating position, the bar 147 is provided with a laterally extending ratchet tooth 152 which is held in operating position by the latch hook 153, when the handle 150 is manually pushed downwardly. The latch hook 153 comprises a plate 154 which is pivotally mounted at the front of the frame 30, on a pivot pin 155. A spring 156, fixed to the plate and frame, is adapted to retain the frame in pivoted position to the right so that the hook 153 engages the tooth 152. The upper edge of the plate 154 is provided with a V-shaped cut-out 157.

A cam 158 is fixed to the shaft 32 adjacent the drive pulley and is adapted to engage a roller 159 on an arm 160 pivoted to the side of the frame. A bar 161 is reciprocatably mounted on the front of the frame 30 and carries a plate 162 having an opening 163 through which the forward end of the arm 160 extends. The engagement of the cam 158, roller 159, and arm 160 causes downward movement of the bar 161. Upward movement of the bar is provided by a spring 164 attached to the upper end of the bar. The plate 162 is also provided along on edge with a hook portion 165.

A second bar 166 is mounted adjacent and parallel to the bar 161 by means of conventional pins and slots permitting vertical movement. A latch member 167 is pivoted on the front of the bar and is adapted to swing into the path of movement of the hook portion 165. The bar 166 is also provided with a projecting pin 168 adapted to enter the cut-out 157 in the plate 154.

An electro-magnet 169 is mounted on the frame 30 and is provided with a magnetically operable arm 170 having a resilient extension extending between pins 171 in the latch member 167 and normally retains the latch member in pivoted position to the left out of the path of movement of the hook 165. The top of the bar 166 is provided with a laterally extending hook 172 so that upward movement of the bar 161 will raise the bar 166 after it has been lowered. One of the stock positioning devices is shown in Fig. 20, the die plate being omitted for clearness.

*The operation*

The operation of the machine may now be described:

The stock 10 is fed into the blanking and piercing die 12 by inserting into the slot 75, Fig. 4. The handle 150 of the stop mechanism is pushed downwardly until the tooth 152 is caught by the hook 153, the arm 148 and roller 149 taking up the slack in the drive belt and causing turning movement of the pulley and of the shaft 32.

In the first cycle of operation, rotation of the cam 48 causes the upper end of the rocker arm 44 to swing to the right, Fig. 1, the lower end of the arm pulls the block 38 and carrier plate 41 to the left until the opening 42 in the plate is in vertical alignment with the die opening 76. Simultaneously, the cam 90 causes the housing 87 and the punches 92 and 93 to descend. The punch 93 forms the piercings 14, the surplus stock dropping out of the machine through the opening 95. The punch 92 blanks out the crowfoot link 13 and pushes it into the opening 42 in the plate 41. The die 12 now lifts and the cam 48 causes the rocker arm 44 to pivot in the opposite direction. The block 38 slides to the right carrying the plate 41 under the die plate 96 and positioning the crowfoot links 13 beneath the die punch 99.

In the meanwhile, the springs 82 push the block 81 and finger 83 into the die 73, the finger 83 engaging the opening in the stock left by the crowfoot link. On the next stroke of the die 12, the cam 86 will move the block 81 and finger 83 rearwardly, thus pulling the stock through the die.

Figures 24, 25, 26:
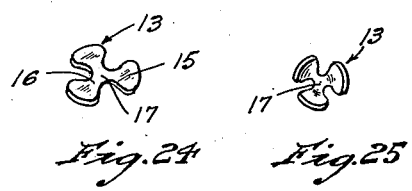
Fig. 24 is an enlarged perspective view of a crowfoot link.
Fig. 25 is a similar view of the link after dapping.
Fig. 26 is a side view of the same.
Figure 27:
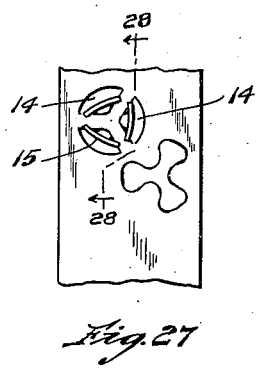
Fig. 27 is a plan view of the stock after passing through the inserting die.
Figure 28:
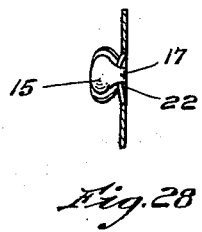
Fig. 28 is a section on line 28—28 on Fig. 27.
Figures 29, 30:
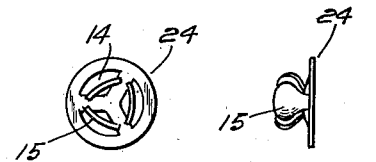
Fig. 29 is a view of the links after passing through the part of the cutting and drawing die.
Fig. 30 is a side view of the same.

Simultaneously with the motion of the plate 41 to the right, the cam 63 and rocker arm 59 causes the block 49 to slide to the left, the plate 41 sliding over the block 49 until the openings 42 and 50 are in alignment. The cam 101 causes the casing 100 and punch 99 to descend, the link 13 being dapped as shown in Fig. 25 and being pushed into the block 49. Further movement of the cam 63 and rocker arm 59 pulls the block 49 to the right beneath the inserting die 21. The stock 10, which emerges from the rear of the die 12, is given a half turn by hand to position the burrs inwardly while passing it beneath the machine to the front and into the die 21.

The cam 113 moves the housing 111 and punch 108 downwardly; the pin 112 pushing the plunger 56 and causing the lever arm 54 to push upwardly. This causes the plunger 51 to push the dapped crowfoot link 13 upwardly out of the block 49 and into the piercings 14 in the stock; the punch 108 pulling the arms of the link 13 inwardly, Fig. 27. Further downward movement, which is taken up by the spring 110, causes the plunger 51 to give the link 13 an additional bump to form the depressed portion 22, Fig. 28.

The stock 10, carrying the link 13, is passed beneath the machine and into the slot 118 of the cutting and drawing die 23. The cams 123 and 124, working in unison, cause the punch 127 to descend, the outer portion 128 cutting the segment 24 from the stock.

The punch 128 continues through the die plate 116. In the meanwhile, the block 49, carrying the plate 64 has been moved to the left by the rocker arm 59, bringing the plate opening 65 under the die 23. As the segment 24 reaches the restricted portion 120 of the die, downward motion of the punch 128 ceases. However, the cam 124 gives the inner punch 129 an additional downward push drawing the segment 24 into the form shown in Figs. 31 and 32. Simultaneously, plunger 68 is pushed upwardly against the arms 19 of the segment and causing the enlarged heads 15 of the crowfoot links 13 to move inwardly beyond the edge of the link 25.

The die 23 now raises and the rocker arm 59 moves the block 49 and plate 64 beneath the assembly draw die 26. The segment 24 is carried beneath the die punch 138, Fig. 15. The punch 138 pushes the segment through the draw die, positioning each segment over the previous one as in Fig. 33, the spring 145 and split die parts 144 retarding movement of the chain links. As each segment is pushed over the other and drawn, the enlarged heads 15 of the crowfoot links 13 are pushed upwardly into the next segment, around its crowfoot link, and beyond the arms 19. The drawing action of the die 26 cramps the parts together, see Fig. 34, so that each crowfoot link can no longer be withdrawn from the adjacent segment. This forms the links into a finished, connected snake chain.

To insure accuracy without danger of jamming or breaking the dies, the feed is provided with the safety stop mechanism hereinabove described. Referring to Figs. 4 and 17, the die 12 is provided with a false punch 94 which is positioned to enter one of the openings left by the blanking of the crowfoot links at each stroke of the die. The punch 94 is slidably mounted in a vertical recess, and is releasably retained in lowered position by a transverse spring pressed pin 173 having its inner end bearing against a shallow cut-out 174 in the punch 94. If the feed is inaccurate, the punch 94 will hit the stock 10 and be pushed upwardly, forcing the pin 173 outwardly against the action of its spring. The outer end of the pin hits a pivoted arm 175 which swings and closes an electric circuit, Fig. 19, the current passing through the machine and through the electromagnet 169.

Figure 21:
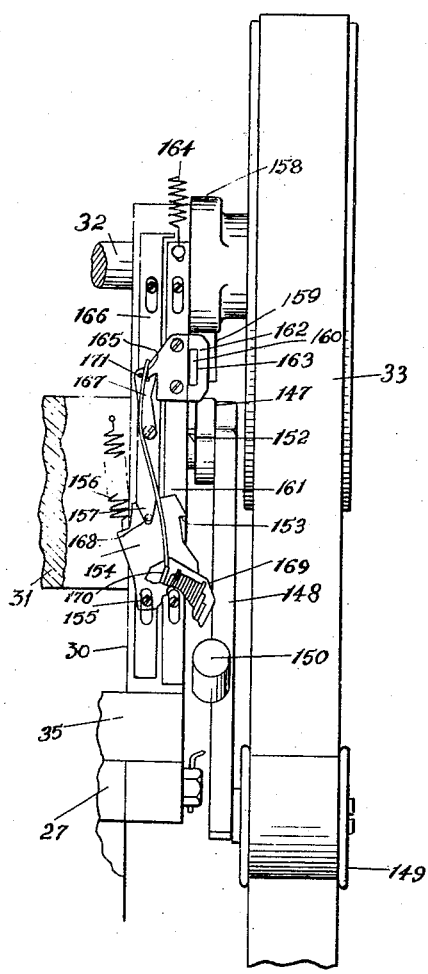
Fig. 21 is an enlarged fragmentary front elevation of the stop mechanism.
Figure 22:
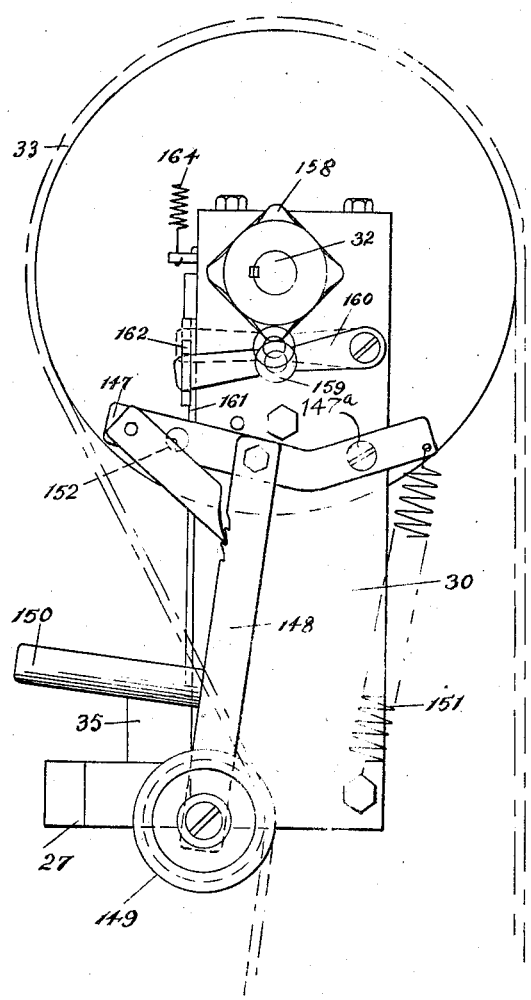
Fig. 22 is a side elevation of the same.

Referring now to Figs. 1, 21 and 22, the magnet 169 pulls the arm 170 to the right, which causes the latch hook 167 to pivot to the right in the path of vertical reciprocation of the plate 162. The plate hook 165 engages the hook 167 and moves it and the bar 166 downwardly. This causes the pin 168 to enter the cut-out 157 and pivot the plate 154 to the left, releasing the latch 153 from the latch hook 152. The spring 151 pivots the arm 147 and moves the roller 149 away from the drive belt, easing the tension and stopping the machine. Since the cam 154 has four high points, the bar 161 will reciprocate 4 times for each revolution of the shaft 32. Thus, if the stop mechanism is set in motion, the machine will make only one-fourth (¼) of a revolution before it is stopped.

The die 23 is also provided with a safety stop mechanism which is tied into the same wiring circuit, Fig. 19. A false punch 176, similar to the punch 94, is slidably mounted at the rear of the die and is adapted to operate a spring pressed pivoted lever 177 which engages a contact 178 and sets off the electric stop mechanism as hereinabove described.

The above described machine will manufacture a continuous length of snake chain with great speed, a high degree of accuracy, and a minimum of break-downs.

While I have described a specific machine and a specific method of assembly, it is obvious that changes may be made in the machine and method without departing from the spirit and scope of the invention as defined in the appended claims.

I claim:

1. In the continuous manufacture of snake chains, the steps of blanking successive connecting links from a metallic strip and simultaneously piercing the metallic strip, inserting each connecting link into a piercing, cutting the piercings and the connecting links from the strip, drawing the piercings into the form of chain links, superimposing each chain link on the previously formed link, and again drawing the superimposed chain links to lock the connecting links to the chain links.

2. In the continuous manufacture of snake chains, the steps of blanking successive connecting links having a plurality of arms from a metallic strip and simultaneously piercing a plurality of openings in the metallic strip, inserting each connecting link arm into a piercing, cutting the piercings and the connecting links from the strip, drawing the piercings into the form of chain links, superimposing each chain link on the previously formed link, and again drawing the superimposed chain links to lock the connecting links to the chain links.

3. In the continuous manufacture of snake chains, the steps of blanking successive connecting links having a plurality of arms from a metallic strip and simultaneously piercing a plurality of openings in the metallic strip, inserting each connecting link arm into a piercing, cutting the piercings and the connecting links from the strip, drawing the piercings into the form of chain links, superimposing each chain link on the previously formed link, and inserting the arms of each link through the piercings of the next formed link, and again drawing the superimposed chain links to lock the connecting links to the chain links.

4. In the continuous manufacture of snake chains, the steps of blanking successive connecting links from a metallic strip and simultaneously piercing the metallic strip, dapping each connecting link, inserting each connecting link into a piercing, cutting the piercings and the connecting links from the strip, drawing the piercings into the form of chain links, superimposing each chain link on the previously formed link and again drawing the superimposed chain links to lock the connecting links to the chain links.

5. In a continuous manufacture of snake chains, the steps of blanking successive connecting links having a plurality of arms from a metallic strip and simultaneously piercing a plurality of openings in the metallic strip, dapping each connecting link, inserting each connecting link arm into a piercing, cutting the piercings and the connecting links from the strip, drawing the piercings into the form of chain links, superimposing each chain link on the previously formed link, and again drawing the superimposed chain links to lock the connecting links to the chain links.

6. In a continuous manufacture of snake chains, the steps of blanking successive connecting links having a plurality of arms from a metallic strip and simultaneously piercing a plurality of openings in the metallic strip, dapping each connecting link, inserting each connecting link arm into a piercing, cutting the piercings and the connecting links from the strip, drawing the piercings into the form of chain links, superimposing each chain link on the previously formed link and inserting the arms of each link through the piercings of the next formed link, and again drawing the superimposed chain links to lock the connecting links to the chain links.

7. A machine for the continuous manufacture of snake chain comprising means for blanking a connecting link from a metallic strip and simultaneously piercing said strip, means for inserting said link into the piercing, means for cutting said connecting link and piercing from said strip and shaping the cut-out into a chain link, and means for superimposing successive chain links and locking the connecting links to the chain links to form a completed chain.

8. A machine for the continuous manufacture of snake chain comprising means for blanking a connecting link from a metallic strip and simultaneously piercing said strip, means for dapping said connecting link, means for inserting said link into the piercing, means for cutting said connecting link and piercing from said strip and shaping the cut-out into a chain link, and means for superimposing successive chain links and locking the connecting links to the chain links to form a completed chain.

9. A machine for the continuous manufacture of snake chain comprising a frame, a blanking and piercing die, a dapping die, an inserting die, a cutting and drawing die, and an assembly draw die on said frame, means for feeding a continuous strip of stock through said blanking and piercing die, means for transferring the blank to the dapping die, means for feeding the pierced strip through the inserting die, means for transferring the dapped blank to the inserting die, means for feeding the strip and blank through the cutting and drawing die for cutting links from said strip, means for transferring the cut links to the assembly draw die, an operating shaft on said frame, and cams positioned on said shaft for operating said dies and said feed and transfer means in timed relation.

10. A machine for the continuous manufacture of snake chain comprising a frame, a blanking and piercing die, a dapping die, an inserting die, a cutting and drawing die, and an assembly draw die on said frame, means for feeding a continuous strip of stock through said blanking and piercing die, means for transferring the blank to the dapping die, means for feeding the pierced strip through the inserting die, means for transferring the dapped blank to the inserting die, means for feeding the strip and blank through the cutting and drawing die for cutting links from said strip, means for transferring the cut links to the assembly draw die, an operating shaft on said frame, cams positioned on said shaft for operating said dies and said feed and transfer means in timed relation, and means for stopping the machine when the strip is fed into said machine out of timed relation with said dies.

11. A machine for the continuous manufacture of snake chain comprising a frame, a blanking and piercing die, a dapping die, an inserting die, a cutting and drawing die, and an assembly draw die on said frame, means for feeding a continuous strip of stock through said blanking and piercing die, means for transferring the blank to the dapping die, means for feeding the pierced strip through the inserting die, means for transferring the dapped blank to the inserting die, means for feeding the strip and blank through the cutting and drawing die for cutting links from said strip, means for transferring the cut links to the assembly draw die, an operating shaft on said frame, cams positioned on said shaft for operating said dies and said feed and transfer means in timed relation, and electrically controlled means for stopping the machine when the strip is fed into said machine out of timed relation with said dies.

AUGUST J. ENGLAND.